March 24, 1936.     W. L. UDELL     2,035,411
REAR VIEW MIRROR
Filed June 6, 1934
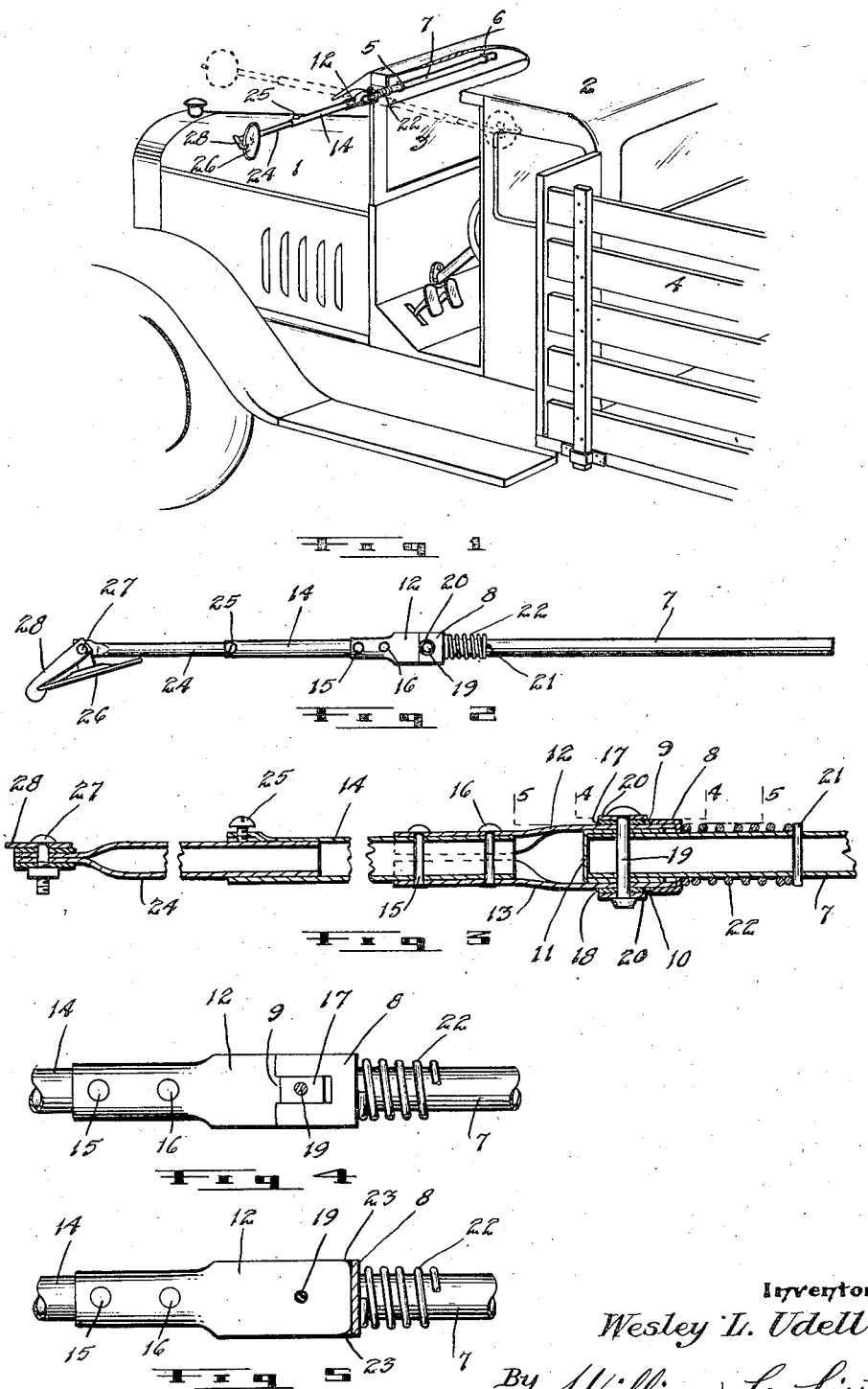

Patented Mar. 24, 1936

2,035,411

UNITED STATES PATENT OFFICE 2,035,411

REAR VIEW MIRROR

Wesley Laverne Udell, Brandon, Manitoba, Canada, assignor of one-half to Ben F. Penrose, Brandon, Manitoba, Canada Application June 6, 1934, Serial No. 729,321

1 Claim. (Cl. 287—14)

The invention relates to improvements in rear view mirrors, especially to that type of mirror designed to fasten on the side of a vehicle for the purpose of permitting the driver to observe another vehicle passing and also see the rear portion of the road on which he is travelling. The invention is more particularly designed for trucks and other vehicles having their rear portion, behind the cab or driving compartment, built out over the wheels preventing a direct view of the rear part of the road from the side of the driver's cab, and an object of the invention is, to provide a mirror which may be extended out to a position, far enough from the cab, to permit the driver a clear view of the rear part of the road therein.

A further object of the invention is, to construct the device in a manner such, that upon the vehicle entering a narrow passage, such as garage doors, or a narrow lane between two buildings where the projecting mirror is liable to strike one of the opposing walls, the extending frame is adapted to swing inward toward the cab and avoid damage to the mirror and, after the vehicle has passed therethrough, can again be swung out to its original position.

A further object of the invention is, to construct the device such, that it will swing in toward the cab in either direction to protect the mirror, whether the vehicle is moving forward or backward.

A further object of the invention is, to construct the hinge in such a manner, that the device is held firmly and free from rattling when in working position, while still retaining all of the above advantages.

A still further object of the invention is, to construct the device in a simple, cheap and durable manner and such, that it can be quickly assembled and when being shipped will occupy a minimum of space.

With the above important objects in view which will become more apparent as the description proceeds, the invention consists essentially in the arrangement and construction of parts hereinafter, more particularly described, reference being had to the accompanying drawing in which:

Fig. 1 is a perspective view of the front part of a truck with the device attached, part of the cab being broken away to expose the attaching means and the mirror shown in dotted outline in both its inswung positions.

Fig. 2 is plan view of the complete rear vision mirror.

Fig. 3 is an enlarged, vertical, sectional view taken at 3—3, Fig. 2.

Fig. 4 is a horizontal sectional view taken at 4—4, Fig. 3.

Fig. 5 is a horizontal, sectional view taken at 5—5, Fig. 3.

In the drawing, like character of reference indicate corresponding parts in the several figures.

A truck is generally indicated by the reference numeral 1 and presents the usual cab 2, windshield 3 and truck body 4, the said truck body extending out over the wheels to the edge of the mudguards while it will be noticed that the cab is located within the area between the footboards thus, preventing a direct, rear view of the road by the driver.

Above the windshield and directly in front of the driver's seat, I fasten as by U bolts 5 and 6, a tube or pipe 7 which comprises the supporting frame of the rear view mirror. The tube projects partially out the side of the cab and passes through the end of a U shaped plate 8, the sides of which parallel the wall of and terminate approximately at the end of the tube. The sides of the plate 8 are also provided with slots 9 and 10 for a purpose later described. A reversed U shaped plate 11 covers the end of the tube, and the sides thereof pass along the outer wall of the tube, and these sides are positioned within the sides of the plate 8. The ends of a pair of hinge plates 12 and 13 are received between the U shaped plates 8 and 11 and the other ends of these plates are semi-circular and span the end of a further tube 14 to which they are fastened by rivets 15 and 16.

On the side faces of the hinge plates 12 and 13 and within the slots 9 and 10 of the plate 8, I position a pair of rectangular guide plates 17 and 18 which are flush with the face of the said plate 8. A rivet 19 passes completely through the guide plates, the hinge plates, the U shaped plate 11 and the tube 7, holding them all together while suitable washers 20 are provided at either end of the rivet.

On the tube 7 and a short distance from the end thereof, I position a stop pin 21 which passes therethrough. Between this pin and the U shaped plate 8, I mount a spring 22 which encircles the tube and forces the plate 8 against the ends of the hinge plates 12 and 13 and in this connection it will be noticed that the corners of the hinge plates are curved as indicated at 23.

The end of the tube 14 telescopically and rotatably receives the end of an extension tube 24 and a jam screw 25 is suitably provided to lock the extension in position. The other end of the extension is flattened and pivotally supports a rear view mirror 26 by the use of a bolt 27. A hook 28 is also fastened by the bolt and hooks over the side of the mirror to re-enforce the metal backing when under pressure.

When installing the device on a truck the operator will release the jam screw 25 and draw out the extension tube 24 until the mirror is at the most advantageous distance to give a good view of the rear part of the road. The tube is then rotated to a position satisfactory for the driver and the jam screw is then tightened. As the rear part of the truck is wide, it is necessary for the mirror to project well out and therefore it is apt to come in contact with exterior objects.

If the truck is entering a narrow passage and the mirror is struck, the tube 14 with the extension 24 and mirror will all rotate around the rivet 19 to either one of the positions shown against the cab in Fig. 1. As this arm so to speak starts to move the extending curved corners 23 of the hinge plates force the U shaped plate 8 back against the spring 22 and the walls of the slots 9 and 10 will ride the sides of the plates 17 and 18 which turn with the hinge plates. As the hinge plates approach a right angle with the tube 7 the spring will force the plate 8 back against the side of the hinge plates completing the turning movement and insuring that the mirror will be held parallel with the body of the truck until the obstruction has been passed and then the driver can swing the mirror back into place.

From the above it will be observed that as long as the mirror is simply subjected to wind pressure the spring 22 will be strong enough to maintain the device rigid and free of squeaks and rattles and it is only when a heavy pressure which might damage the mirror is encountered that the device swings in. It will also be observed that it would make no difference whether the truck is going forward or backward as the mirror or arm will move in the direction in which the pressure is exerted.

What I claim as my invention is:

In a hinge, a member having a pair of flat, parallel, extending tongues, the ends of the said tongues having right angle corners and pivotally receiving a second member therebetween, a U shaped plate slidably carried by the second member and receiving the ends of the parallel tongues therebetween, said plate being aligned with the second member and slotted to receive the pivot pin, a tension spring carried by the second member and adapted to press the plate against the tongues to releasably hold the members in alignment.

WESLEY LAVERNE UDELL.